Oct. 31, 1950     L. E. HATTEN     2,527,507
ADJUSTMENT MEANS FOR EXTERIOR-TYPE REARVIEW MIRRORS
Filed Jan. 9, 1948
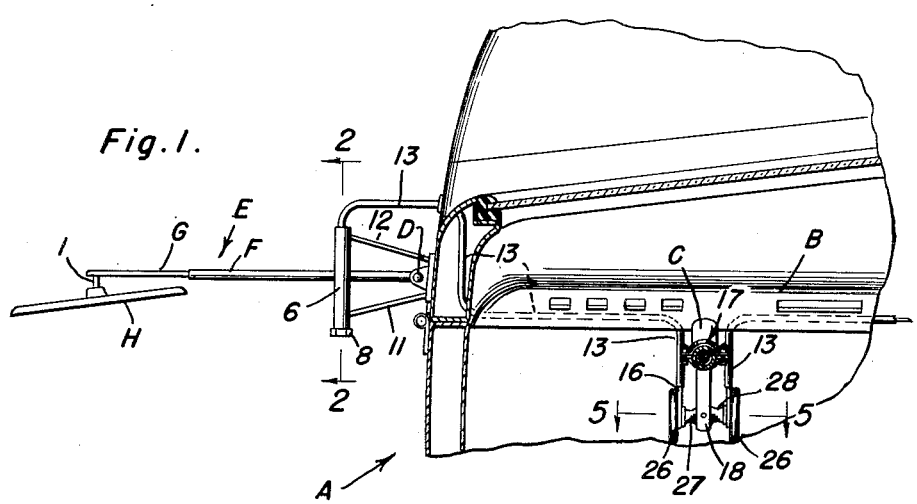
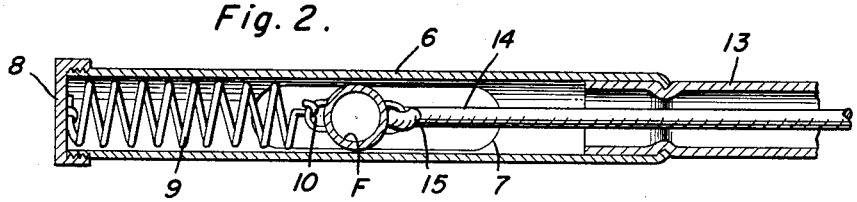
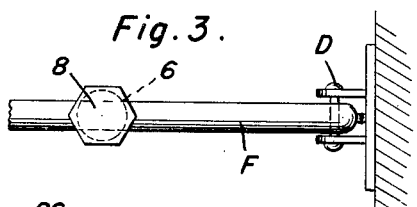
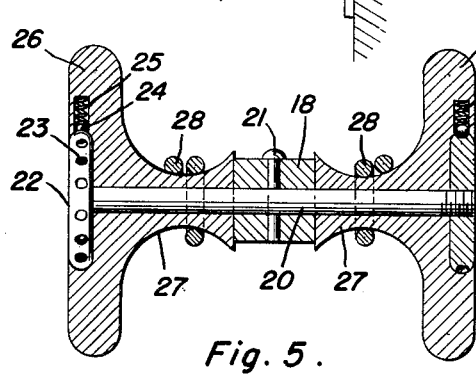
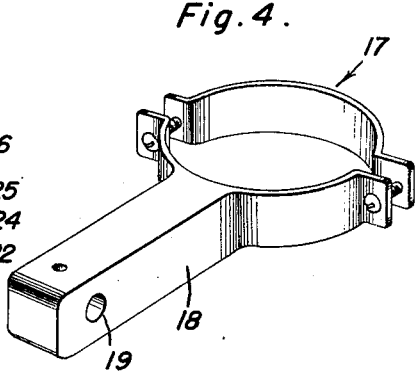
Inventor
Lewis E. Hatten
By *Clarence A. O'Brien*
*and Harvey B. Jacobson*
Attorneys Patented Oct. 31, 1950

2,527,507

UNITED STATES PATENT OFFICE 2,527,507

ADJUSTMENT MEANS FOR EXTERIOR-TYPE REARVIEW MIRRORS

Lewis E. Hatten, Perkinston, Miss.

Application January 9, 1948, Serial No. 1,465

2 Claims. (Cl. 74—501)

The present invention relates to novel structural means operable from a point in close proximity to the driver of a truck or similar vehicle through the medium of which the operator may properly angle and adjust exterior-type right and left hand mirrors.

It is a matter of common knowledge that trucks, buses and the like are often provided with outwardly projecting or exterior-type mirrors, one on the left hand side of the vehicle and also another one on the right hand side. Since drivers are constantly being changed during working shifts and since most drivers are called upon to adjust mirrors to suit themselves, it often happens that a driver finding either one or the other of the mirrors improperly angled during the course of movement of the vehicle, will want to regulate or adjust it to suit his own needs. On the other hand it is obvious that in attempting to adjust mirrors while in motion is often a dangerous moment to all concerned. The particular object of the present invention is, therefore, to provide means which is controllable from a point on the steering column or just beneath the steering wheel, whereby the driver of the vehicle may at any time swing the bracket arms of the mirrors either rearwardly or forwardly with a view toward bringing either one or both of the outside mirrors into a properly desired focus with rear view requirements.

More specifically, the invention has to do with an arrangement of fixtures wherein the mirror arm is slidably mounted in one of the parts thereof and wherein said arm has attached thereto a pull cord or Bowden wire to swing the arm in relation to the fixture means.

Further novelty is predicated upon a Bowden wire control for a mirror supporting arm wherein the wire is reelable on a knob which forms a winding drum and said knob is retained in established position by suitable ball ratcheting and retaining means.

Other objects and advantages of the invention will become more readily apparent from the following description and the accompanying illustrative drawings.

In the accompanying drawings, wherein like numerals are employed to designate like parts throughout the views:

Figure 1 is a fragmentary top view with parts in section and elevation showing a portion of a truck or the like, showing the left-hand rear view mirror and also showing the fixtures and devices which go to make up the present adjustment means for the arm of said mirror.

Figure 2 is an enlarged fragmentary detail section taken on the line 2—2 of Figure 1, looking in the direction of the arrows.

Figure 3 is a fragmentary end view, a view observing the cap end of the slotted cylinder.

Figure 4 is a perspective view of the adapter for attachment to the vehicle steering column.

Figure 5 is an enlarged sectional view on the line 5—5 of Figure 1, looking in the direction of the arrows.

In the drawings in Figure 1 the cab or equivalent part of a truck or bus is denoted by the reference character A, the instrument panel by the reference character B and the steering column by the reference character C. Pivoted, as at D, on the left hand side of the forward portion of the truck or bus is the usual type of exterior rear view mirror E comprising a tube F and the rod telescoping in same as at G, said rod having a mirror H connected thereto by the usual ball and socket joint means I. These are all old parts.

Taking up now the novel aspects of the disclosure, it will be seen that devices are provided on both sides of the truck, left and right, for adjusting the respective mirrors mounted on said sides. However, the devices are the same in construction for both sides and for that reason I have shown the details of the device on one side and will carry forward the description of same conformingly. To this end, I provide a horizontal cylinder or barrel 6 having diametrically opposed elongated slots 7 formed therein, the mirror arm F extending through and being operable in said slots as brought out to advantage in Figure 2. Also, as shown in Figure 2, the screw threaded end portion of said cylinder is provided with a closing cap 8 having a coiled spring 9 fastened thereto, the spring extending into the cylinder and being connected with the arm F, as at 10. Said cylinder 6 is supported from rigid braces 11 and 12 which are connected to the truck body, by way of end portions of the bracket which supports the pivot D. A Bowden wire is employed for imparting movement to the arm F against the return tension of the coiled spring 9 and the Bowden wire comprises a flexible casing 13 and a flexible element or wire 14 mounted therein, the wire 14 being attached to the arm F as at 15. The casing 13 is properly shaped and is threaded through an opening in the side of the truck and then through suitable opening or openings in the instrument panel where it is brought forward to take a position within the vicinity of the steering column C. Here, it is appropriately anchored and the wire end 16 is allowed to protrude for reeling and winding purposes. At this point, an adapter is observed, the same comprising a split clamping collar 17 carrying a shank 18 provided with a bearing 19 for a shaft 20. The shaft 20 is fixedly secured to the shank 18 as at the point 21 in Figure 5. The end portions of the shaft, which project equal distances beyond the shank 18 are provided with heads 22, the latter having recesses forming ball accommodation seats 23 for the spring pressed ball 24. The spring is denoted at 25 and is suitably socketed in place. The spring pressed ball is carried by a hand knob 26 whose hub portion 27 surrounds the shaft 29 and provides a winding drum, in the manner shown at 28 in Figure 5. A ball and ratchet arrangement is thus provided and by gripping the knob and turning same, the Bowden wire may be wound or unwound as desired. When it is wound it is tightened and exerts a pull on the arm F thus moving the arm in the direction of the pull and adjusting the mirror H and its bracket arms in conjunction therewith. This is an angular adjustment and swings the arm in a horizontal plane and in a limited arc to position the mirror at the most advantageous spot for focusing. When the Bowden wire is loosened by unwinding the knob, the coil spring 9 comes into play and exerts the necessary shifting and pulling of the arm F in the opposite direction. It follows therefore that by providing a simple reeling knob and mounting same on a shaft carried by a bracket attached to the column, by employing a Bowden wire or equivalent flexible element, by attaching the same to a swingable arm and a support for the arm, the latter may be swingably adjusted, this in an obvious and practical manner.

It is obvious that the device is shown and described to use both left and right hand mirrors in an evident manner.

This mirror adjuster can also be used on buses for the purpose of pitching or leaning the mirror in such manner enabling the driver to see baggage compartments, bicycles, or any object that could not be seen otherwise from the driver's seat particularly on the driver's side of the bus. It is so arranged to enable the driver to adjust his mirror with the same cable or cord for proper rear view vision.

The telescoping arms F and G are commonly supported by center door hinges (not shown) on older model trucks and on some present models. These arms are attached to a bracket and the door hinge supports the bracket, making it possible for the driver to raise and lower this mirror by means of bolt D.

A driver very often opens his door, and swings the door in order to swing and angle his mirror, use of my mirror adjuster will avoid the preceding practice.

The mirror arm will necessarily be moved up or down at times, but this can be arranged without interference to the adjuster by brazing an extension on bracket and allowing same to cover bolt head D, and extend up arm toward mirror one, two, or possibly three inches. The pull cable may be fastened on end of extension and threaded through 13, thence to adjuster. This extension will be very close and parallel with the arm, yet the arm may be raised and lowered if necessary, as mentioned before.

In order to attach the bracket to the door hinge, the pin is pulled from the door hinge and the bracket is attached by use of a bolt. This bracket can be attached to cab and a coil spring so arranged in bracket to hold necessary tension or arm not being supported by door.

Changes in shape, size, materials and rearrangement of details and parts may be resorted to in actual practice, so long as they do not depart from the spirit of the invention or the scope of the appended claims, as is well understood.

Having described the invention, what is claimed as new is:

1. In a structure of the class described, a cylinder open at one end and provided intermediate its ends with elongated guide slots, said slots being in diametrically opposed relation and adapted to permit the passage of an adjusting arm for an exterior type rear view mirror, a closing cap for one end of the cylinder, a coiled spring arranged in said cylinder and attached at one end to said cap, the opposite end of the spring being adapted for connection with the mirror arm, a Bowden wire comprising a casing attached at one end to one end of said cylinder, a flexible element in said casing adapted to extend into the cylinder, a bracket adapted to be mounted on said truck body, braces connected rigidly to the respective end portions of said bracket and casing, a knob constituting winding drums for a motion transmitting wire, a headed shaft and support therefor, said knob surrounding said shaft and head and being provided with spring pressed ball detents engageable in the depressions provided in said head in the manner and for the purposes stated.

2. In a structural assemblage of the class described, a bracket adapted to be securely mounted on the exterior of a truck or equivalent body, a horizontally disposable cylinder open at opposite ends and having one end restricted and the other end externally screw threaded, said cylinder being provided intermediate its ends and in diametrically opposite ends with elongated slots, a screw cap on the screw threaded end, a coiled spring attached at one end to said cap and confined within said cylinder, the restricted end of the cylinder being adapted to accommodate an end portion of a tubular casing for a Bowden wire, a pair of braces secured at corresponding ends to said bracket and secured at their opposite corresponding ends to the end portions of said cylinder, a tubular arm pivotally mounted on the bracket at one end and having a portion extending through said slots, the portion of the arm within the confines of said cylinder being provided with diametrically opposite accommodation eyes, one end of the coil spring connected with one eye, the other eye being adapted to accommodate an end portion of a Bowden wire, a collar adapted to embrace a steering post on the stated truck, said collar having an outstanding shank, a shaft secured to said shank and projecting beyond the shank and provided on one end with a head, that portion of the shaft between the head and shank constituting a journal, a knob having a bearing mounted for rotation on said journal, said knob having a portion rotatably surrounding said head and further including a Bowden wire winding drum, locking and retaining means interposed between the knob and marginal portion of the head.

LEWIS E. HATTEN.

REFERENCES CITED

The following references are of record in the file of this patent:

UNITED STATES PATENTS

| Number | Name | Date |
| --- | --- | --- |
| 809,310 | Long | Jan. 9, 1906 |
| 1,364,268 | Fletcher | Jan. 4, 1921 |
| 2,148,964 | Schepler | Feb. 28, 1939 |
| 2,330,444 | Park | Sept. 28, 1943 |
| 2,472,438 | Price | June 7, 1949 |